United States Patent

Passaniti et al.

[11] Patent Number: 6,001,508
[45] Date of Patent: *Dec. 14, 1999

[54] AGO CATHODE BATTERY

[75] Inventors: Joseph Lynn Passaniti, Fitchburg; El-Sayed A. Megahed, Madison, both of Wis.; Nuri A. Zreiba, Tripoli, Libyan Arab Jamahiriya

[73] Assignee: Rayovac Corporation, Madison, Wis.

[*] Notice: This patent issued on a continued prosecution application filed under 37 CFR 1.53(d), and is subject to the twenty year patent term provisions of 35 U.S.C. 154(a)(2).

[21] Appl. No.: 08/825,403

[22] Filed: Mar. 27, 1997

Related U.S. Application Data

[60] Continuation of application No. 08/387,284, Feb. 10, 1995, abandoned, which is a division of application No. 08/075,889, Jun. 14, 1993, Pat. No. 5,389,469.

[51] Int. Cl.[6] .................................................... H01M 4/34
[52] U.S. Cl. ......................................... 429/219; 252/182.1
[58] Field of Search ......................... 429/219; 252/182.1

[56] References Cited

U.S. PATENT DOCUMENTS

| | | | |
|---|---|---|---|
| 3,118,275 | 1/1964 | McLain et al. | 149/37 |
| 3,297,503 | 1/1967 | Hoffmann et al. | 149/37 |
| 3,671,343 | 6/1972 | Gawlick et al. | 149/37 |
| 3,677,840 | 7/1972 | Shaw et al. | 149/19 |
| 3,695,951 | 10/1972 | Helms et al. | 149/37 |
| 4,001,146 | 1/1977 | Horowitz | 252/514 |
| 4,141,727 | 2/1979 | Shida et al. | 252/514 |
| 4,383,029 | 5/1983 | Yamada et al. | 430/545 |
| 4,678,127 | 7/1987 | Megahed et al. | 429/206 |
| 4,743,302 | 5/1988 | Dumesnil et al. | 106/1.23 |
| 4,835,077 | 5/1989 | Megahed et al. | 429/206 |
| 5,118,662 | 6/1992 | Agostinelli et al. | 505/1 |
| 5,389,469 | 2/1995 | Passaniti et al. | 429/206 |

OTHER PUBLICATIONS

Chemical Abstract 105:15676k, 1986 (No month).
Chemical Abstract 115:84023p, 1991 (no month).
Abstract of Japan Patent 73–014838, Aug. 1993.
Goodenough et al, "Exploring the $A^+ B^{5+} O_3$ Compounds," J. Solid State Chem., vol. 6 No. 4, Apr., 1973.

*Primary Examiner*—John S. Maples
*Attorney, Agent, or Firm*—Thomas D. Wilhelm; Brian R. Tumm; Michael L. Winkelman

[57] ABSTRACT

Solid divalent silver oxide is reacted in hot aqueous alkaline reaction medium with a solid bismuth component and a reducing agent. The reaction product comprises a novel compound containing silver, bismuth, and oxygen, which is used in making cathode pellets for use in alkaline electrochemical cells. The cells exhibit low internal impedance and substantially single voltage discharge characteristic of monovalent silver oxide while retaining a significant portion of the coulombic capacity a of divalent silver cathode, without toxicity problems attendant cathodes containing lead and/or cadmium. Particulate cathode materials are disclosed comprising an intermediate layer of $AgO_2$ disposed between a core of AgO and an outer layer comprising silver and bismuth moieties.

6 Claims, 7 Drawing Sheets

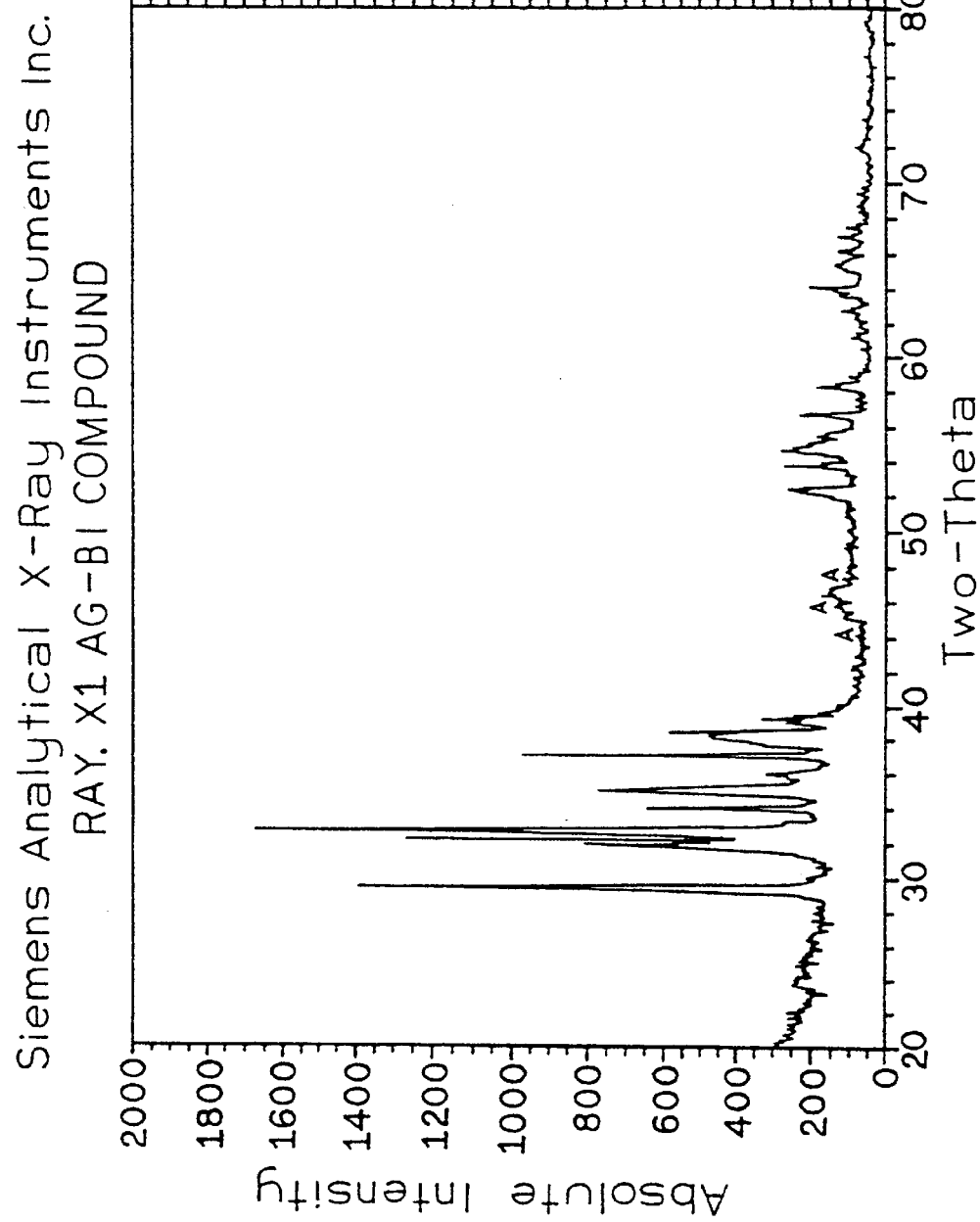

AGO CATHODE BATTERY

This application is a Continuation of Ser. No. 08/387,284 filed Feb. 10, 1995 now abandoned; which is a Divisional of Ser. No. 08/075,889 filed on Jun. 14, 1993 now U.S. Pat. No. 5,389,469.

FIELD OF THE INVENTION

This invention relates to cathodes based on AgO, for use in alkaline electrochemical cells. More particularly, it relates to preparation and use of a novel AgO cathode material which, when placed in alkaline electrochemical cells allows for cells having highly stable cathodes, low impedance, single-voltage discharge under even low drain, and low potential for toxicity hazards.

BACKGROUND OF THE INVENTION

It is well known in the art of electrochemical cells to provide a cell having a cathode of divalent silver oxide (AgO). When associated with a suitable anode, e.g., zinc and a suitable electrolyte, e.g., aqueous sodium hydroxide containing or saturated with zinc oxide, this material provides a cell of relatively high coulometric capacity per unit volume, and desired voltage.

The art is also aware that AgO, by itself, has certain deficiencies as a cathode material. For example, in storage and between periods of use, AgO in contact with cell electrolyte can decompose, releasing gaseous oxygen, thus simultaneously increasing pressure inside a sealed cell and reducing coulometric capacity. Furthermore, AgO provides dual voltage when electrolytically discharged. Initially upon discharge, AgO provides an undesirably high voltage characteristic of the AgO → $Ag_2O$ reaction and thereafter provides a lower, desirable voltage characteristic of the $Ag_2O$ → Ag reaction. Still further, a cell employing unmodified AgO as a cathode may be characterized by a changing internal resistance, namely an internal resistance which increases with time, both at room temperature and at elevated temperatures. Heretofore, numerous disclosures have been made which suggest methods of treating one or more of these problems, including:

| Country | Patent No. | Inventor/Applicant | Issued |
| --- | --- | --- | --- |
| Japan | 78/63542 | Murakami et al | 1978 |
| USA | 3,017,448 | Cahan | 1962 |
| USA | 4,015,056 | Megahed et al | 1977 |
| USA | 4,078,127 | Megahed et al | 1978 |
| USA | 4,835,077 | Megahed et al | 1989 |

The Murakami et al disclosure appears to be similar to that of Cahan in U.S. Pat No. 3,017,448. Both Cahan and Murakami et al disclose that the gassing of AgO can be inhibited by treating AgO with lead or lead component. Cahan discloses Pb, PbO, $Pb(OH)_2$ and sodium plumbate as materials suitable for addition to an AgO electrode or treatment of an AgO electrode, while Murakami et al teaches treating AgO with an alkaline solution containing a plumbate ion. Cahan specifically discloses that use of his treatment enhances or extends the duration of cell discharge at the undesirably high voltage characteristic of the AgO → $Ag_2O$ reaction. Thus, even though Cahan tended to solve the gassing problem associated with use of AgO cathodes, the solution exacerbated the afore-stated dual voltage problem.

Megahed et al, in U.S. Pat. No. 4,078,127 ("Megahed I") claims the use of metallic sulfide additives, incorporated into the AgO cathode material by dry mixing metallic sulfides and AgO. Specifically, Megahed I teaches that sulfides of cadmium, calcium, mercury, tin, tungsten, (or mixtures thereof) included in the cathode mixture, inhibit AgO gassing. Megahed I discloses that some of the sulfides, when included in the cathode mix, reduce cell impedance both initially and during discharge. Further, Megahed I discloses that cadmium sulfide is effective as a sulfide additive under the conditions of mix preparation prescribed therein. However, under the conditions so prescribed, Megahed I discloses that AgO cathode mixes which contain up to 3% lead sulfide are not beneficial to the stability of such AgO electrochemical cells, since such cathode mixes were detrimental to the impedance of cells upon high temperature storage. Moreover, Megahed I, while stating "cadmium sulfide was found to improve the voltage stability of cells . . . ", does not disclose, much less claim, that cadmium sulfide additives yield cells with a single voltage discharge under low drain conditions.

Megahed et al, in U.S. Pat. No. 4,015,056 ("Megahed II"), herein incorporated by reference, discloses and claims a two-step process which yields an AgO cathodic material having a single voltage discharge. In the first step, an AgO pellet is treated with a mild reducing agent, such as methanol to form a thin outer layer of $Ag_2O$ on the surface of the pellet. Then, after consolidation, the pellet is treated with a strong reducing agent such as hydrazine, to form a silver layer on the pellet surface which faces the typical internal plastic membrane. Cells containing such cathodes display the OCV and CCV values typical of the $Ag_2O$—Zn electrochemical cell system, apparently controlled by the thin outer layer comprising monovalent silver oxide and/or elemental silver. However, with time, such cells develop a relatively high internal impedance and high open circuit voltage (OCV).

U.S. Pat. No. 4,835,077 to Megahed et al ("Megahed III"), herein incorporated by reference, suggests reacting divalent silver oxide with powdered lead sulfide in hot alkaline solution; whereby the resulting particles are taught to have an interior comprising AgO, a thin outer layer comprising silver and lead, and a thin intermediate layer of $Ag_2O$. It appears that the two outer layers are formed concurrently during the reaction process carried out in hot alkaline reaction medium. The resulting cell appears to have the desired voltage characteristic of monovalent silver oxide, while having a constant low internal impedance.

In addition to the above listed references, there are other references pertaining to the properties, formation and stability of AgO. "Electrode Phenomena of Silver-Silver Oxide System in Alkaline Batteries" by Yoshizawa and Takehara published in the Journal of the Electrochemical Society of Japan, Volume 31, Number 3, pages 91–94 (1963) reports the effect of various metallic additives on the oxidation of silver electrodes. Among the additives suggested, gold was reported to increase the rate of formation of divalent silver oxide during the electrochemical formation of silver electrodes, e.g. oxidation of silver.

Another article entitled "The Electric Resistivity of Silver oxide" by Tvarusko published in the Journal of the Electrochemical Society, Volume 115, Number 11, pages 1105–1110 (November, 1968) reported on various metallic additives and their effect on the electric resistivity of divalent silver oxide. The article reports that mercury and lead added during the preparation of silver oxide decreased the electric resistivity of silver oxide. The article further confirms the disclosure of Cahan in U.S. Pat. No. 3,017,448, that using lead in an AgO cathode extends the time during discharge at which the cell exhibits the undesirably high voltage characteristic of the AgO → $Ag_2O$ reaction.

U.S. Pat. No. 3,617,384 to Kamai et al discloses a secondary zinc alkaline cell in which gold or silver, their alloys, oxides and hydroxides, may be added to a zinc anode.

U.S. Pat. No. 3,650,832 to Tvarusko discloses additives for divalent silver oxide selected from mercury, selenium, tellurium, and combinations of mercury, with tin or lead.

Japan Patent Application No. 48-1929, opened in 1973, discloses adding gold hydroxide to the electrolyte of an alkaline silver oxide cell.

U.S. Pat. No. 3,853,623 to Davis discloses gold ion additive for divalent silver oxide cathode material.

U.S. Pat. No. 3,936,026 to Howard discloses, as cathode materials, mixtures of divalent silver oxide with (i) sulfur and (ii) silver sulfide.

British Patent 1,065,059 discloses the addition of cadmium oxide, magnesium oxide, or aluminum oxide to a silver electrode.

While Megahed III does provide a stable, single voltage, AgO cathode material having low impedance throughout discharge, by incorporating lead additives into the cathode material, the toxicity and ultimate disposal of the lead compounds used therein are of concern.

It is an object of this invention to provide an AgO cathode material similar to that of Megahed III, and producing equivalent electrochemical properties, but without the toxicity concerns which attend the use of lead.

It is another object to provide such an AgO cathode material having low impedance.

Still another object is to provide a low-toxicity AgO cathode material which can be used to make an electrochemical cell which is thermally stable, has low internal impedance, and displays a single voltage discharge at even low drains, over at least 95% of the cell discharge capacity.

Yet another object is to provide an alkaline electrochemical cell having low toxicity, substantially single voltage discharge, and low impedance.

Another object is to provide a method of producing a cathode material wherein the cathode material is a reaction product of divalent silver oxide and a bismuth compound, and wherein the reaction product comprises a compound of silver, bismuth, and oxygen.

SUMMARY OF THE DISCLOSURE

Some of the objects are attained in a composition of matter comprising AgO, $Ag_2O$, and a compound comprising silver and bismuth, preferably a compound comprising silver, bismuth and oxygen, such as $AgBiO_3$. The composition comprises, by weight, about 7 to about 70 percent AgO, about 24 to about 75 percent $Ag_2O$, and about 6 to about 18 percent $AgBiO_3$, preferably about 32 to about 39 percent AgO, about 49 to about 55 percent $Ag_2O$, and about 12 to about 13 percent $AgBiO_3$.

Other objects of the invention are attained in a cathode material comprising, as chemically reactive components thereof, $Ag_2O$ and a compound comprising silver and bismuth, preferably a compound comprising silver, bismuth and oxygen, such as $AgBiO_3$. Preferably, the cathode material includes, as a chemically reactive component, AgO. Also preferably, the cathode material has low impedance, and discharges at substantially the same voltage at high drains and low drains.

The cathode material of the invention preferably comprises the solid product of the reaction of a first component comprising AgO and a second component comprising Bismuth, the reaction having taken place under reducing conditions in aqueous alkaline medium at a temperature of at least 40 degrees C. Preferably, the reacting AgO component is comprised of particles having a size of about 16 to about 62 microns, and the reacting bismuth component comprises a bismuth compound selected from the group consisting of bismuth metal, a mixture of bismuth and sulfur, bismuth oxide, bismuth sulfate, bismuth sulfite, bismuth sulfide, and bismuth nitrate. Additionally, the cathode material can contain a cathode additive selected from the group consisting of graphite, $Ag_2O$, $MnO_2$, NiOOH, CaO, MgO, HgO, CdO, CdS, carbon, polytetrafluoroethylene (PETFE), and metallic silver. Typically, cathode additives are added at levels between about 2 and about 12% by weight.

In practice, such cathode materials can discharge at least 95%, potentially at least 99%, of their designed cell capacity at a single voltage at drains of one microampere or less per square centimeter.

Still others of the objects are attained in an electrochemical cell having an anode, an electrolyte, and a cathode body, the cathode body comprising the solid product of the reaction between the AgO component and a bismuth component as described with respect to the cathode material, and wherein the electrochemical cell discharges at an apparent single voltage, at both high and low drains. In such electrochemical cell, the cathode body preferably comprises AgO, $Ag_2O$, and a compound comprising silver and bismuth, and may comprise a cathode additive such as that disclosed above. The electrolyte preferably comprises either sodium hydroxide and zinc oxide or potassium hydroxide and zinc oxide. The anode is preferably zinc. Such electrochemical cells can discharge at least 95%, preferably at least 99%, of their electrochemical capacity at a single voltage at drains of one microampere or less per square centimeter.

The invention also comprehends a method for producing the above described cathode material. The method comprises the steps of reacting together a reaction mixture, at a temperature between 40 degrees C. and the boiling point of the reaction mixture, for at least one hour, the reaction taking place under reducing conditions, the reaction mixture comprising (i) an aqueous alkaline reaction medium, (ii) AgO comprising particle sizes generally about 16 to about 62 microns, and (iii) a bismuth compound selected from the group consisting of bismuth, a mixture of bismuth and sulfur, bismuth oxide, bismuth sulfate, bismuth sulfite, bismuth sulfide, and bismuth nitrate, said bismuth compound comprising between about five percent and about fifteen percent by weight of the combination of the AgO and the bismuth compound; and recovering, as the cathode material, the solid reaction product so produced. The reaction is preferably carried out at a temperature between 70 degrees C. and 80 degrees C. The bismuth compound preferably comprises $Bi_2S_3$, in an amount of about 8.5 percent by weight of the combination of AgO and the bismuth compound. Preferred reaction time is about six hours, with longer times being contemplated, such as eight hours or more. The cathode additive is either added to the reaction mixture (preferably about thirty minutes before the reaction is stopped) or to the dried cathode material after the mixing is complete.

BRIEF DESCRIPTION OF THE DRAWINGS

FIGS. 3–5 illustrate the x-ray diffraction characteristics of the preferred cathode material of the invention.

DETAILED DESCRIPTION OF THE ILLUSTRATED EMBODIMENTS

While the present invention is applicable to all types of silver oxide cathode materials, cathodes used in alkaline electrochemical cells, and such cells themselves, the invention will be described in terms of a silver oxide/zinc button cell.

Figure 2A:
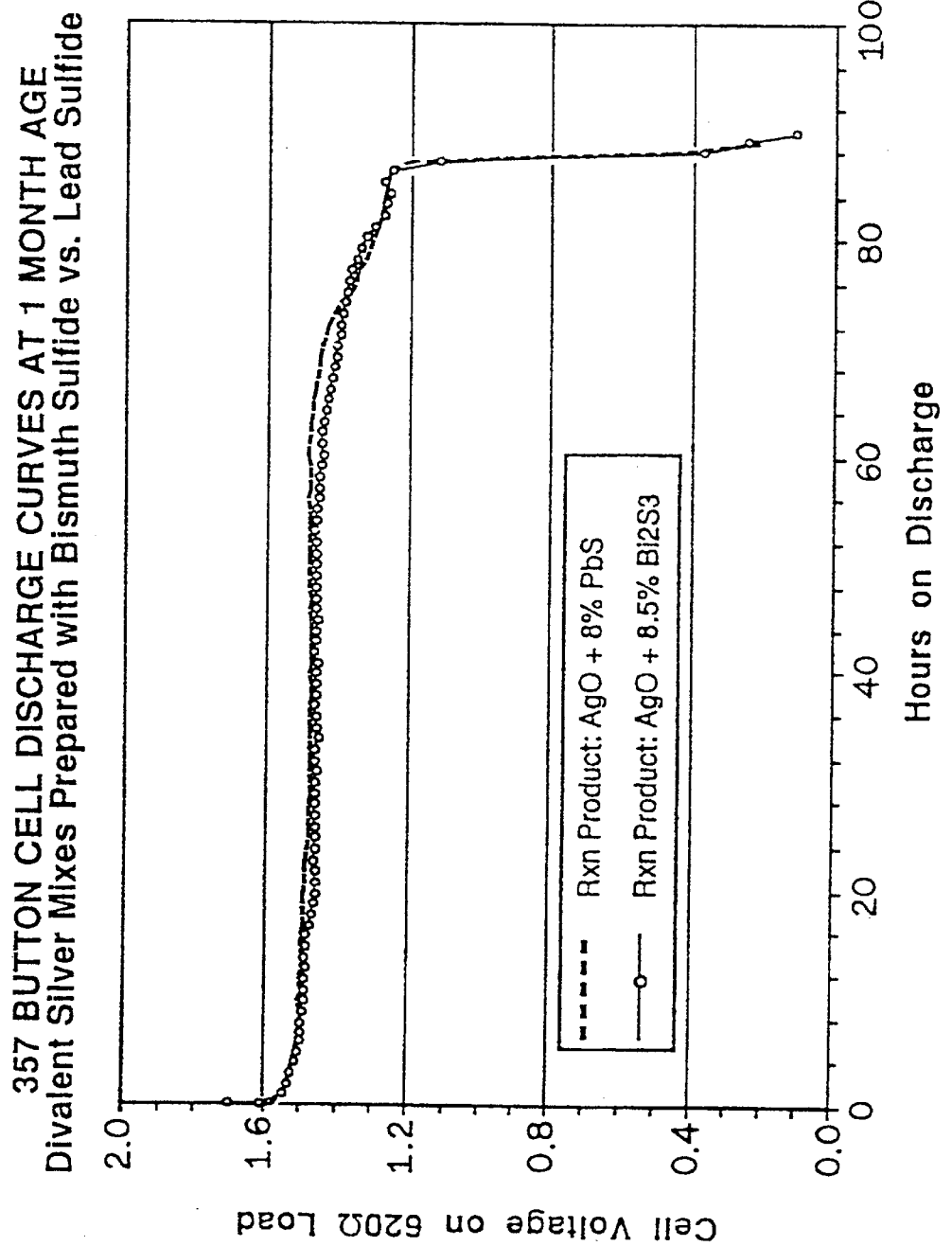
FIGS. 2A and 2B are graphs showing the comparative cell performance of cells of this invention, as compared to lead-based cells.
Figure 2B:
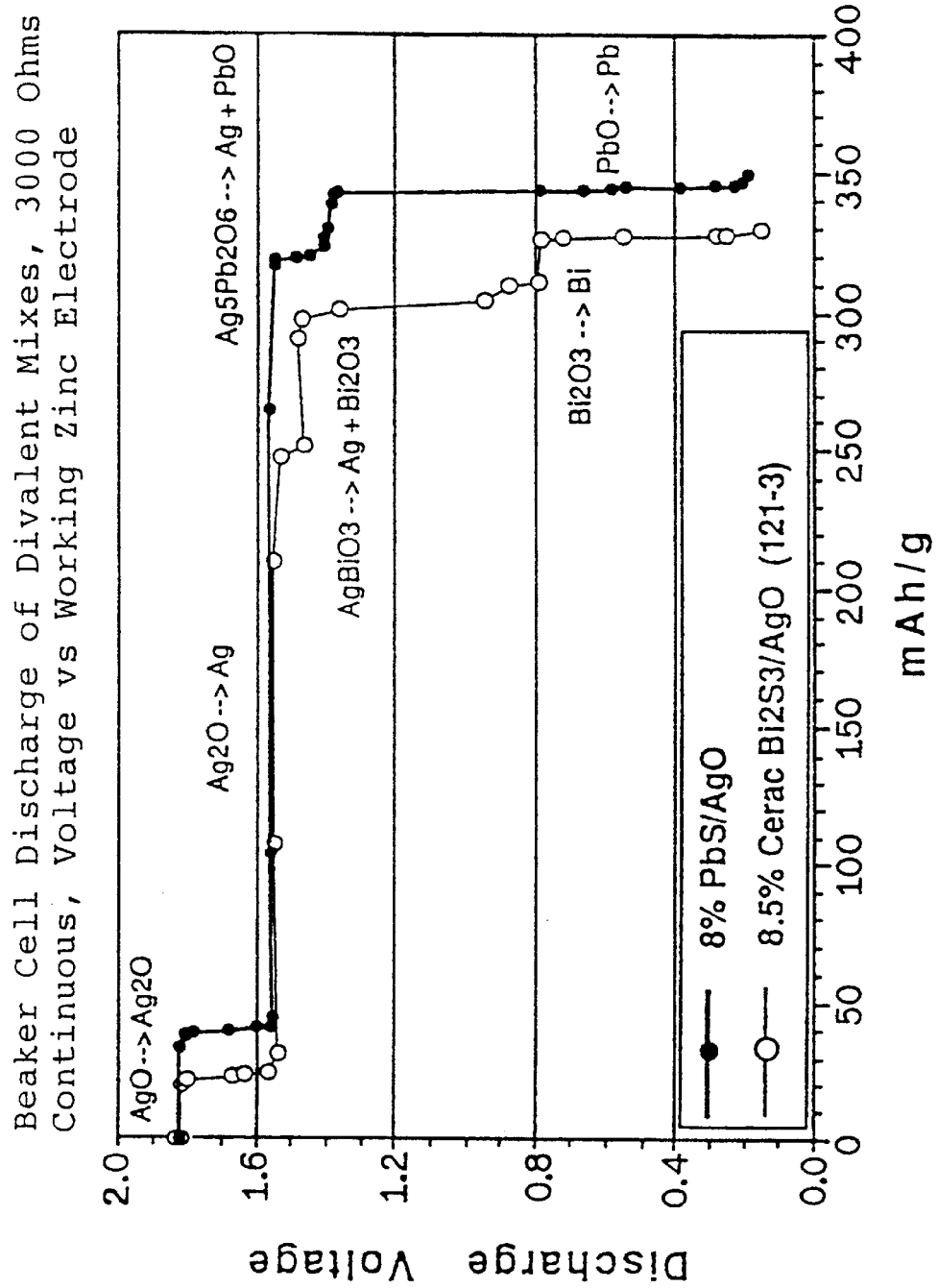

In general, the AgO cathodic material disclosed by the present invention has very low impedance. Moreover, when the AgO cathode material is incorporated into alkaline electrochemical cells, such cells exhibit a single voltage discharge over at least 95%, and typically over at least 99%, of the coulombic life of the cell, even under low drains. Moreover, the length of time that the initial higher voltage persists, as illustrated in FIG. 2B, can be reduced by short-term storage of the cell at room temperature for about 30 days. Accordingly, since cells typically spend more time than that in reaching the ultimate customer through ordinary distribution channels, the initial higher voltage is of no practical concern.

The method of producing the cathode material of the invention comprises reacting powdered divalent silver oxide with between about 4 and about 17, preferably about 4 to about 12, percent by weight of a bismuth compound, preferably $Bi_2S_3$, in a hot aqueous alkaline solution, e.g. between 40 degrees C. and the boiling point of the alkaline solution, for 1–8 hours. The reaction product is recovered from the aqueous medium by conventional liquid-solid separation means, for example by decantation followed by washing with distilled water and vacuum drying. "Drying", as used herein, contemplates accompanying mechanical mixing for break-up of agglomerates, and for uniform drying, under drying conditions, until a free-flowing powder is obtained. For example, a 200 pound batch of filtered reaction product is dried by tumbling it in a rotating drier under vacuum conditions at 60 degrees C. for about 4 to about 16 hours.

The reaction product consists of divalent silver oxide (AgO), monovalent silver oxide ($Ag_2O$), and one or more compounds comprising silver and bismuth. The reaction product can be compressed in the normal manner to form a cathode body, e.g. a pellet for use in button-type cells. The cathode body so formed exhibits substantially a single voltage potential characteristic of the $Ag_2O \rightarrow Ag$ reaction and a coulometric capacity proportional to the amount of divalent silver oxide in the pellet. Fresh and aged cells with a zinc anode, sodium hydroxide or other alkaline electrolyte, and a cathode made with material produced by the process of the invention have low impedance which is substantially constant, both initially and throughout discharge.

Figure 1:
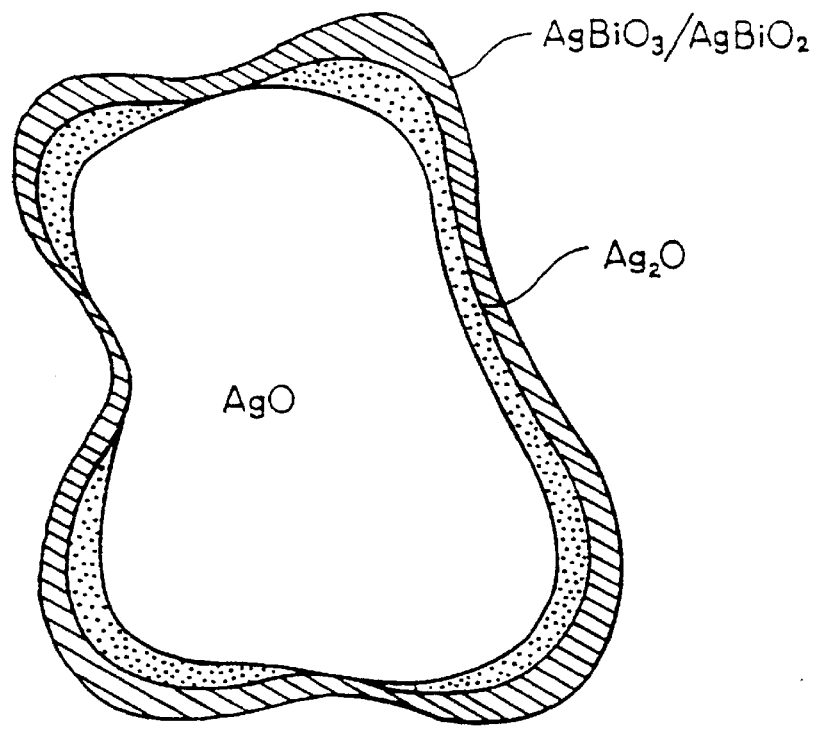
FIG. 1 is a two-dimensional illustration of a particle of cathode material of this invention.

While the reaction product of the AgO and $Bi_2S_3$ is not fully understood, it is hypothesized that, in the reaction product, the particles of AgO are coated with an intermediate layer of $Ag_2O$ and a thin conductive outer layer comprising silver and bismuth as illustrated in FIG. 1. Chemical analysis of the reaction product discloses that the reaction product includes the heretofore unknown silver-bismuth compound $AgBiO_3$ and possibly $AgBiO_2$. The reaction product contains, by weight, about 7 to about 70 percent AgO, about 24 to about 75 percent $Ag_2O$, and about 6 to about 18 percent $AgBiO_3$. Thus, the reaction product contains, by weight, at least 31 percent silver oxide (AgO plus $Ag_2O$). The preferred reaction product contains, by weight, about 32 to about 39 percent AgO, about 49 to about 55 percent $Ag_2O$, and about 12 to about 13 percent $AgBiO_3$.

Figure 4:
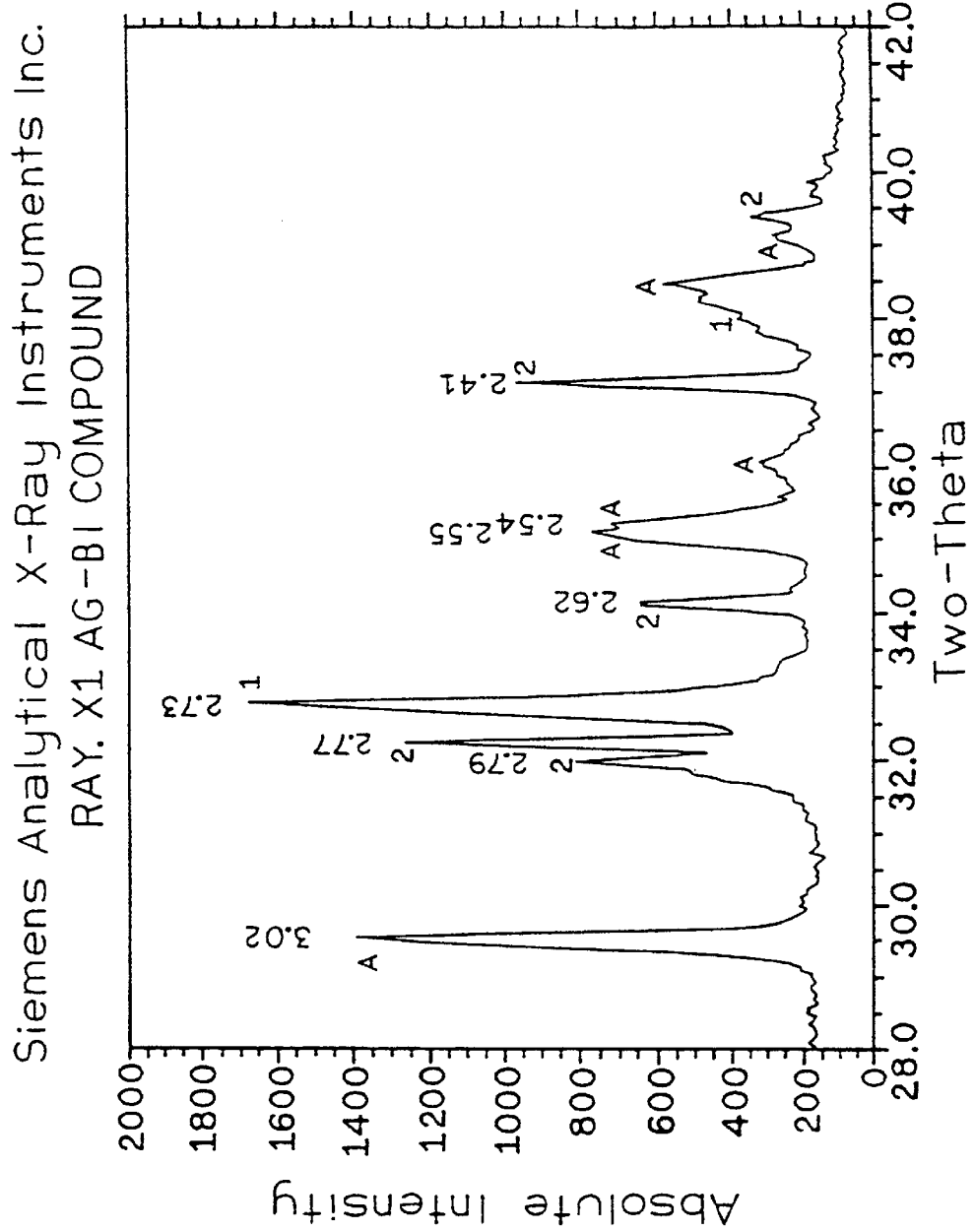
Figure 5:
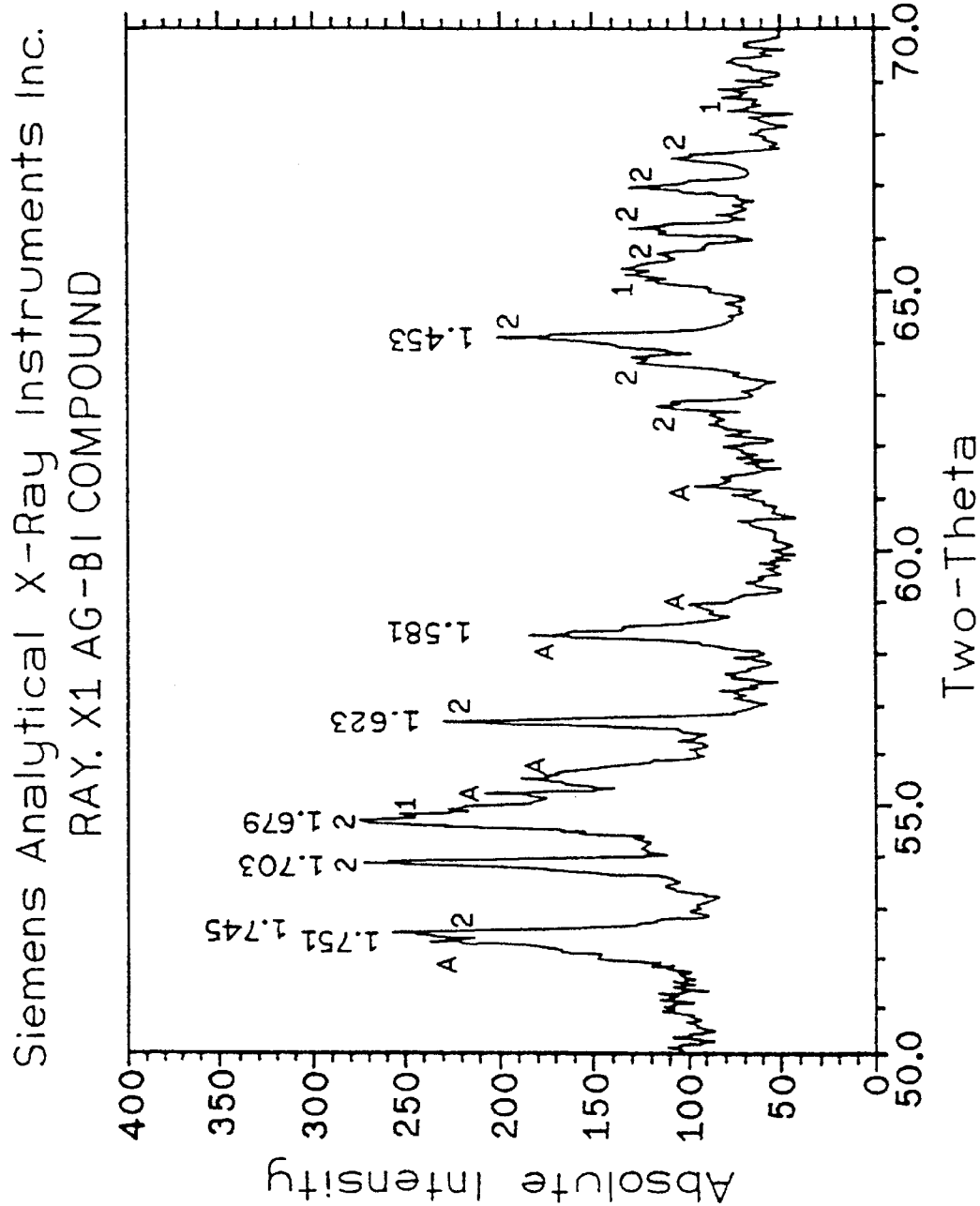

X-ray diffraction analysis, using a copper target (wavelength=1.5406 Angstroms), of a typical reaction product of the invention is illustrated in FIGS. 3–5. FIG. 3 shows the broad range x-ray diffraction chart between 28 and 70 (2 theta) degrees. FIGS. 4–5 are expanded views of the chart of FIG. 3 at the respective indicated frequencies of 28–42 degrees and 50–70 degrees. The compound analyzed therein was formed by reacting AgO with 8.5% by weight $Bi_2S_3$ at 80 degrees C. in 18% NaOH aqueous solution, as illustrated in the examples following. Multiple diffraction peaks were observed, some of which conform to $Ag_2O$. Peaks representative of $Ag_2O$ are labeled "1". Peaks related to AgO seem to also be present, and have been labeled "2". All of the AgO peaks appear to be shifted in a direction suggesting some increase in interplanar spacing. Several unaccountable peaks are labeled "A". None of the existing diffraction patterns of silver-bismuth compounds in the JCPDS files match these unknown peaks. Specifically, compounds whose diffraction peaks do not match the unknown peaks are:

| | |
|---|---|
| Bismuth sulfides | Bismuth silver sulfides |
| Bismuth sodium | Bismuth sodium oxides |
| Bismuth oxide sulfide | Bismuth oxides |
| Silver sulfides | Bismuth sodium oxide hydrates |
| Silver sodium oxide | Sodium bismuth |
| Sodium hydroxide | Sodium Hydroxide hydrates |
| Sodium silver | Sodium silver oxide |
| Sodium | |

The following equations suggest a reaction sequence that summarizes the reaction process as it is understood by the inventors.

(1) $24AgO + Bi_2S + 6NaOH \rightarrow 12\ Ag_2O + Bi_2O_3 + 3Na_2SO_4 + 3H_2O$ (2) $4AgO + Bi_2O_3 \rightarrow 2\ AgBiO_3 + Ag_2O$ (3) $Ag_2O + Bi_2O_3 \rightarrow 2\ AgBiO_2$ According to these equations, both $AgBiO_3$ and $AgBiO_2$, and/or perhaps some other compound of bismuth, silver, and oxygen, are indicated, as are AgO and $Ag_2O$. A small amount of unreacted $Bi_2S_3$ may be present. Button cells made with the reaction product so produced exhibit substantially a single voltage representative of the $Ag_2O \rightarrow Ag$ reaction, indicating the thin layer of $Ag_2O$ between the AgO and the outer surface of a given particle of reaction product, as illustrated in FIG. 1. $Ag_2O$ has high impedance. But the button cells made with the reaction product exhibit low impedance, whereby a layer of a low impedance material is indicated between the $Ag_2O$ and the outer surface of the particle.

While applicants cannot presently prove that the suggested chemical reactions are necessarily correct, there is supporting evidence that the hypothesized approach is correct. For example, after the reaction (using 8.5% $Bi_2S_3$ by weight) is completed, chemical analyses showed a loss of sodium hydroxide while total sulfur analyses show a sulfur compound in the spent reaction solution, which qualitatively has been identified as a sulfate. Additionally, calculations from the predicted reaction equations and chemical analysis of the reaction product agree quite well, as illustrated in Table 1.

TABLE 1

| Component | Expected (Based on Reaction Equation) | Determined (Based on Chemical Analysis) |
|---|---|---|
| Total % Ag | 82.8% | 82.5% |
| Total % Bismuth | 6.7% | 6.5% |
| Oxidizers as % AgO | 46.9% | 50.4% |
| Coulometric Capacity | 339 mAhr | 342 mAhr |

The relative insolubility of the $Bi_2S_3$ and AgO reactants in the hot sodium hydroxide solution means that for the reaction to take place, the $Bi_2S_3$ and AgO particles must be in contact. This suggests that effective stirring or other means of agitation, increase the degree to which the reactants react, thereby obtaining the desired reaction product.

As those of ordinary skill in the art will appreciate, both pellets and consolidated cathodes made with the novel cathode material of the present invention can contain other active or inactive ingredients. Moreover, such pellets and consolidated cathodes can be treated with hydrazine or other reducing agent which forms a surface coating of metallic silver on the cathode pellet.

The cathode particle 10 seen in FIG. 1 represents one of a large number of particles which are consolidated in making a pellet of cathode material for use in an electrochemical cell. As is well known, the AgO core of the particle is preferred for its higher coulombic capacity. The outwardly-disposed layer of $Ag_2O$ is preferred for its lower voltage. A low-impedance material is needed on the outer surface, outwardly of the $Ag_2O$ layer to provide low impedance to the particle of cathode material. Accordingly, the two outer layers of the cathode material particle illustrated in FIG. 1 are needed to provide necessary electrochemical properties to the cathode material, and thus to the cathode body made therewith. But coulombic capacity derives from a high fraction of AgO on the interior of the particle. Thus, the higher the fraction of AgO in the cathode material which makes up the cathode body (12 in FIG. 6), the greater the coulombic capacity of the cell made with the cathode body. Accordingly, AgO particles used as reactants in this invention should have at least a minimum particle size. Particle size is measured using a laser light scattering technique as, for example, that provided by using a Microtrak R Particle-Size Analyzer, manufactured by Leeds & Northrop, Model 7991. Typical particle size is given numerically in Table 2, and is illustrated graphically in FIG. 6. As illustrated therein, the sample is primarily composed of particles between 16 and 62 microns in size; about 75 percent by volume beiiig between 22 and 44 microns, about 42 percent being between 31 and 44 microns in size; with a small fraction, less than 5 percent by volume, being less than 16 microns.

TABLE 2

Microtrak Particle Size Analysis of Divalent Silver Oxide

| Diameter, Microns | Volumetric Percent |
|---|---|
| 88–125 | 0.0% |
| 62–88 | 0.1% |
| 44–62 | 14.4% |
| 31–44 | 40.7% |
| 22–31 | 34.4% |
| 16–22 | 5.2% |
| 11–16 | 0.0% |
| 7.8–11 | 3.4% |
| 5.5–7.8% | 1.2% |

A suitable method for preparing such particles is taught by Kim in "The Preparation of AgO by the Ozonation of $Ag_2O$ in Alkaline Solution," in "Progress in Batteries & Solar Cells" (Vol. 5) 1984.

A variety of bismuth compounds can be used for reaction with the AgO. While the AgO is desirably present in relatively large particle size, it is necessary that the bismuth be present in small enough particle size that the solid particle be able to be substantially consumed, in the reaction time available, by the reaction with the AgO. Particle size for the bismuth compound should not exceed 820 microns, but preferably should not exceed 74 microns (–200 US mesh) measured by standard screen sieving process. The bismuth sulfide compounds used in the reactions of the invention are preferably prepared by a wet process. Exemplary, but by no means exhaustive of acceptable bismuth compounds, are bismuth metal, $Bi_2(SO_4)_3$, and $Bi(NO_3)_3.5H_2O$. The preferred bismuth reactant compound is $Bi_2S_3$, supplied as Prep. 5, Stock No. B-1070 Spec. by Cerac Inc., Milwaukee, Wis.

Referring to the preferred bismuth compound, it appears that the sulfide component is responsible for reducing a thin layer of the AgO in formation of the $Ag_2O$ layer. Accordingly, if another bismuth compound is selected, which does not have a reducing agent attached, then a suitable reducing agent can be added separately. For example, if powdered bismuth metal is used, then powdered sulfur may be added as the reducing agent. Other exemplary reducing agents which may be used are sulfides (e.g. $Na_2S$), sulfite, (e.g. $Na_2SO_3$,) $NaBH_4$, methanol, or the like.

A variety of "additive" materials can be added to the reacted cathode material to further modify its properties. Exemplary of such additives are cost-reducing additives such as graphite, $Ag_2O$, $MnO_2$, NiOOH, CaO, MgO, HgO, CdO, CdS, and carbon, and performance additives such as polytetrafluoroethylene, and metallic silver.

EXAMPLES

Figure 6:
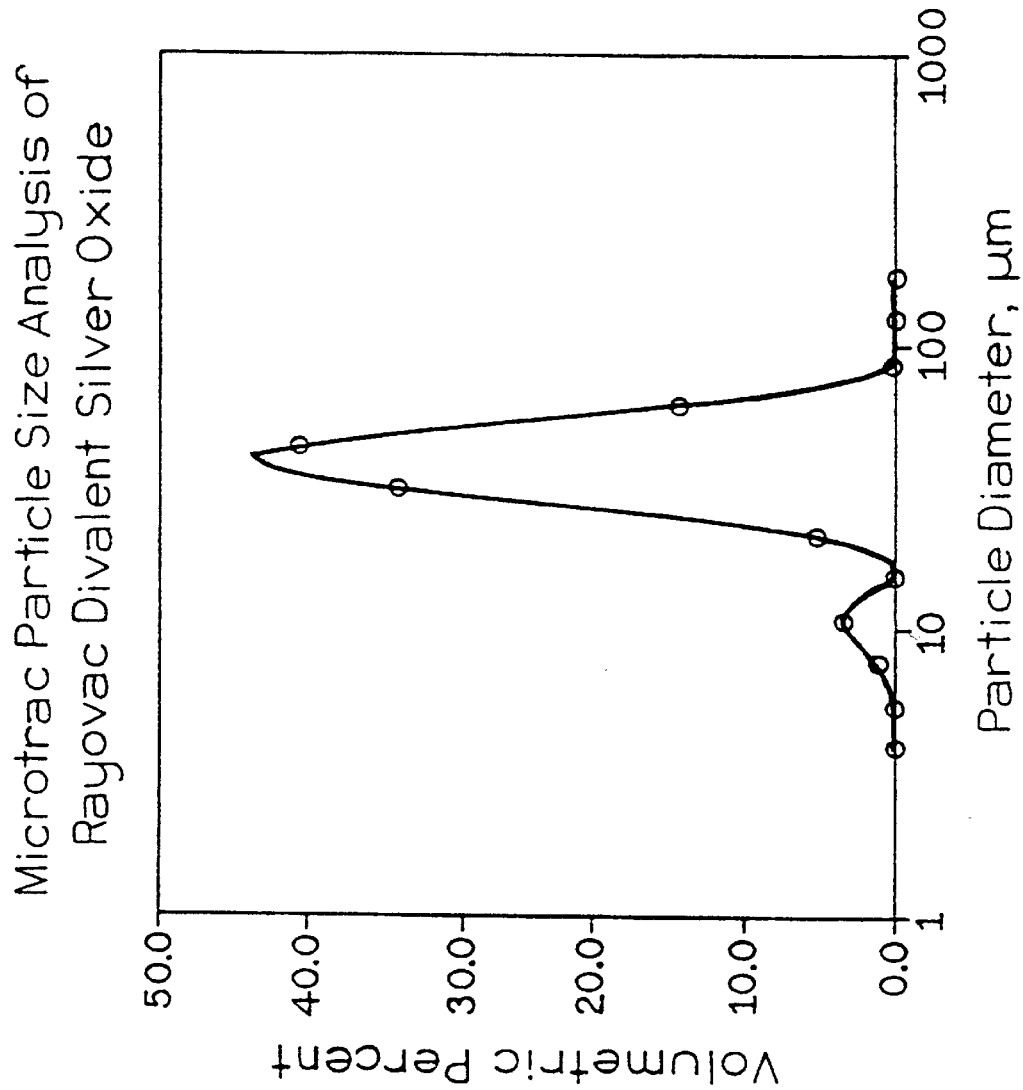
FIG. 6 is a graph showing the size distribution of the cathode material particles of this invention.

A hot alkaline reaction medium was prepared by heating an aqueous solution of 18% by weight NaOH to 70 degrees C. with stirring. AgO reactant was prepared by reacting $Ag_2$ with ozone to form divalent AgO particles having the particle size distribution generally as illustrated in FIG. 6. Bismuth sulfide ($Bi_2S_3$) powder, Prep. 5, Stock No. B-1070 Spec. was obtained from Cerac Inc. Particle size of the powder was –200 mesh.

First, 91.5 parts by weight of the divalent AgO so prepared were added to the hot alkaline reaction medium, and stirring was maintained for 30 minutes. Then 8.5 parts by weight of the powdered bismuth sulfide were added all at once, and stirring was maintained throughout the rest of the reaction. Upon addition of the bismuth sulfide, the temperature rose to 80 degrees C., where it was maintained throughout the rest of the reaction process.

The reaction mixture was held at constant temperature, with stirring, for 4 hours, during which the solid powder reactants reacted in, and perhaps with and/or through, the hot alkaline reaction medium. When the reaction was stopped, 4 hours after the bismuth sulfide was added to the reaction medium, the reacted powder was separated from the liquid reaction medium by filtration, washed with distilled water and dried.

Then 2% by weight standard polytetrafluoroethylene cathode additive and 10% by weight silver powder were added to the cathode material after the cathode material was dried, to make the composite cathode product, percentages being based on total weight of the composite cathode product. The polytetrafluoroethylene acts as a lubricant and binder, thereby improving the ability to form pellets from the cathode mixture. Metallic silver helps to reduce the amount of time the cell discharges at undesirable voltages above 1.7 volts. metallic silver initially also increases pellet strength.

Figure 7:
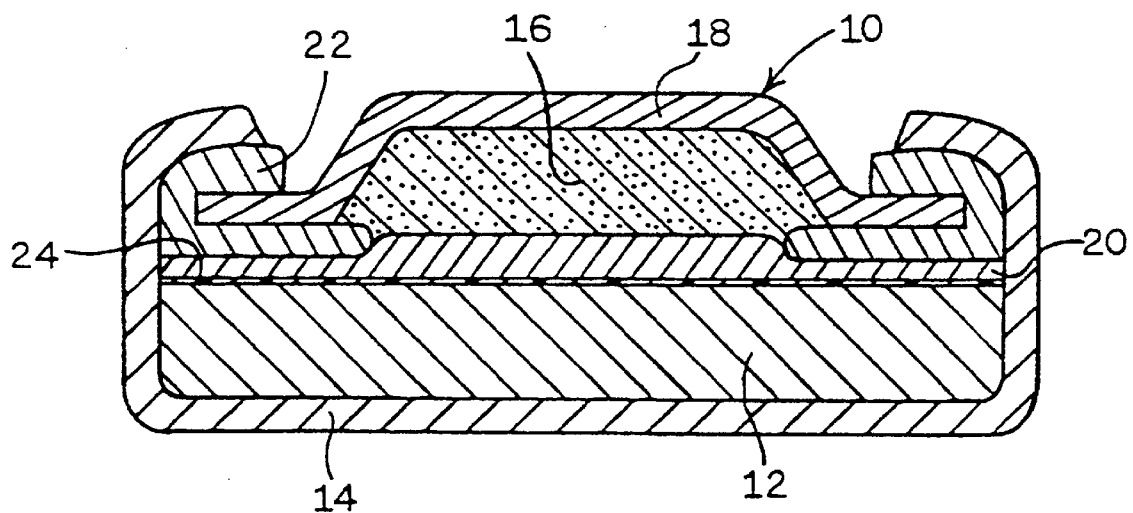
FIG. 7 shows a cross-section of a typical electrochemical cell made according to this invention.

The reacted powder was pressed into cathode pellets 12 in conventional cathode cans 14 of nickel/steel/nickel, prepared for making button cells 10 as illustrated in FIG. 7. Conventional alkaline electrolyte was added to each zinc anode. Then zinc anodes 16, having the electrolyte, and conventional caps 18 of nickel/steel/copper were added, along with conventional semi-permeable membranes 20 and conventional plastic seals 22, to the conventional cathode cans.

FIG. 7 and Table 3 illustrate cells so made. All cells in Tables 3, 4, and 5 following were 357 size cells prepared with cathodes containing 2% by weight polytetrafluoroethylene powder and 10% by weight silver powder. All bismuth sulfide reactants illustrated in Test Nos. N–Q (Table 3), X (Table 4), and C (Table 5) were "Prep 5" material from Cerac Inc., that had been screened to –200 mesh.

TABLE 3

Bismuth/AgO Mix Formulations in 357 Cells

| Test No. | % Metal Sulfide Reacted With AgO | Cell Capacity mAh to 1.3 V 620 Ohm Drain | Capacity Retention 40 days, 140 Deg. F. | Expansion After Storage 4 Weeks, 160 Deg. F. |
|---|---|---|---|---|
| L | 0% | 212 | 84% | 23 mils |
| M | 8% Pbs (Megahed III) | 202 | 96% | 6 mils |
| N | 8.5% $Bi_2S_3$ | 190 | 95% | 4 mils |
| O | 12% $Bi_2S_3$ | 197 | 89% | 4 mils |
| P | 16% $Bi_2S_3$ | 188 | 92%* | 4 mils |
| Q | 20% $Bi_2S_3$ | 178 | 92%* | 3 mils |
| S | 6.9% Bi + 1.1% S | 198 | 83%* | 4 mils |
| T | 8.1% $Bi_2O_3$ + 1.1% S | 205 | 87% | 5 mils |
| U | 8.1% $Bi_2O_3$ + 1.1% $NaBH_4$ | 207 | 86% | 6 mils |
| V | 7.3% $Bi_2S_3$ + 10.7% $Na_2S$ | 205 | 94% | 3 mils |
| W | 6.9% $Bi_2O_3$ + 15.5% $Na_2SO_3$ | 204 | 93% | 3 mils |

*Capacity Retention after 4 weeks at 160 degrees F.

According to test "L," AgO without the bismuth or lead suffers from cell expansion due to cathode decomposition or gassing. Tests N–W show various ways of employing bismuth in the invention, to obtain suitable electrochemical cells. Tests N–W also show how the bismuth compounds perform relative to the compounds of Megahed III.

Table 4 shows the affect of including various cost-reducing additives in the cathode composition, along with the performance additives of powdered silver and polytetrafluoroethylene. Most if not all of the effective additives are less costly than the AgO they replace. Test "X" in Table 4 is the same as Test "N" in Table 3.

TABLE 4

Bismuth/AgO Mix Formulations in 357 Cells

| | | 357 Cell Performance | | |
|---|---|---|---|---|
| Test No. | 8.5% $Bi_2S_3$ With Blend Additives* | Pellet Resistivity Ohm-cm | Impedance (1000 Hz) | CCV (100 Ohm) | mAh to 1.3 V on 620 Ohm Drain |
| X | No Additives | 0.1 | 10 | 1.516 | 190 |
| Y | 5% $MnO_2$ | 1.0 | 9 | 1.479 | 185 |
| Z | 5% HgO | 1.0 | 9 | 1.435 | 183 |
| AA | 5% $Ag_2O$ | 0.8 | 9 | 1.394 | 170 |
| BB | 5% CdO | 1.1 | 8 | 1.427 | 175 |
| CC | 5% PbO | 1.0 | 6 | 1.435 | 181 |
| DD | 5% $PbO_2$ | 0.7 | 8 | 1.426 | 176 |
| EE | 5% NiOOH | 0.8 | 10 | 1.483 | 177 |
| FF | 5% Graphite | 0.7 | 6 | 1.422 | 181 |

*Refers only to cost-reducing additives.

Table 5 shows the benefit of using bismuth. Cathode composition prepared with $Bi_2S_3$ is comparable in performance to the composition prepared with PbS as in Megahed III, without its toxicity. AgO, either alone or with other metal sulfides, suffers some performance deficiency, such as high pellet resistivity or poor cell CCV. Only bismuth provides the non-toxic reaction compounds which offer low resistivity, low cell impedance, and high CCV, while providing comparable cell performance.

Test "C" in Table 5 is the same as Test "N" in Table 3 and Test "X" in Table 4.

TABLE 5

Divalent Silver Oxide 357 Cells, Prepared with Metal Sulfides

| | | 357 Cell Performance | | | |
|---|---|---|---|---|---|
| Test No. | Sulfide Reacted With AgO | Pellet Resistivity Ohm-cm | Impedance (1000 Hz) | CCV (100 Ohm) | mAh to 1.3 V on 620 Ohm Drain |
| A | 0% | 71 | 73 | 0.958 | 212 |
| B | 8% PbS (Megahed III) | 0.1 | 10 | 1.406 | 202 |
| C | 8.5% $Bi_2S_3$ | 0.1 | 10 | 1.516 | 190 |
| D | 8.2% $SnS_2$ | 200 | 75 | 0.912 | 201 |
| E | 9.7% $Ws_3$ | 770 | 386 | 0.196 | 0 |
| F | 4.1% CoS | 3200 | 72 | 0.966 | 195 |
| G | 5.0% CaS | 6300 | 15 | 1.301 | — |
| H | 5.0% ZnS | 11000 | 16 | 1.255 | — |
| I | 4.1% NiS | 23800 | 114 | 0.606 | 191 |
| J | 5.0% FeS | 39000 | 12 | 1.251 | — |

As illustrated in FIG. 2B, freshly prepared cathode material of this invention, when discharged on 3000 ohms resistance in a beaker cell against zinc metal exhibits multiple plateaus at about 1.78–1.85 volts, about 1.55–1.65 volts, about 1.4–1.55 volts, and about 0.75–0.85 volts, which are characteristic of the cathode material produced in this invention. As button cells are constructed to be anode limited, these voltages may not be observed during cell discharge. As cells age, the high voltage plateau at about 1.75 to 1.85 volts is reduced or eliminated. FIG. 2A illustrates the 620-ohm discharge profile of a 357 dell prepared with a cathode of this invention and a zinc anode.

Thus, the invention provides an AgO cathode material similar to that of Megahed III, and producing equivalent electrochemical properties, but without the toxicity concerns which attend the use of lead.

The invention also provides such an AgO cathode material having low impedance.

The invention further provides a low-toxicity AgO cathode material which can be used to make a thermally stable electrochemical cell which has low internal impedance and displays a single voltage discharge at even low drains, over at least 95% of the cell discharge capacity.

The invention still further provides an alkaline electrochemical cell having low toxicity, substantially single voltage discharge, and low impedance.

The invention also provides a method of producing a cathode material wherein the cathode material is a reaction product of divalent silver oxide and a bismuth compound, and wherein the reaction product comprises a compound of silver, bismuth, and oxygen.

Those skilled in the art will now see that certain modifications can be made to the materials, apparatus, and methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

Having thus described the invention, what is claimed is:

1. A particulate cathode material, comprising particles wherein each said particle comprises an intermediate layer of $Ag_2O$ disposed between an AgO core and an outer layer comprising silver and bismuth moieties.

2. A particulate cathode material as in claim 1, said outer layer comprising $AgBiO_3$.

3. A particulate cathode material as claim 1, said outer layer comprising $AgBiO_2$.

4. An electrochemical cell having an anode, an electrolyte, and a cathode pellet comprising electroactive cathode particles of said particulate cathode material of claim 1 bonded to each other.

5. An electrochemical cell as in claim 4 said electrolyte comprising potassium hydroxide.

6. A particulate cathode material as in claim 1, wherein the outer layer consists essentially of $AgBiO_3$.

* * * * *